Figure 1:
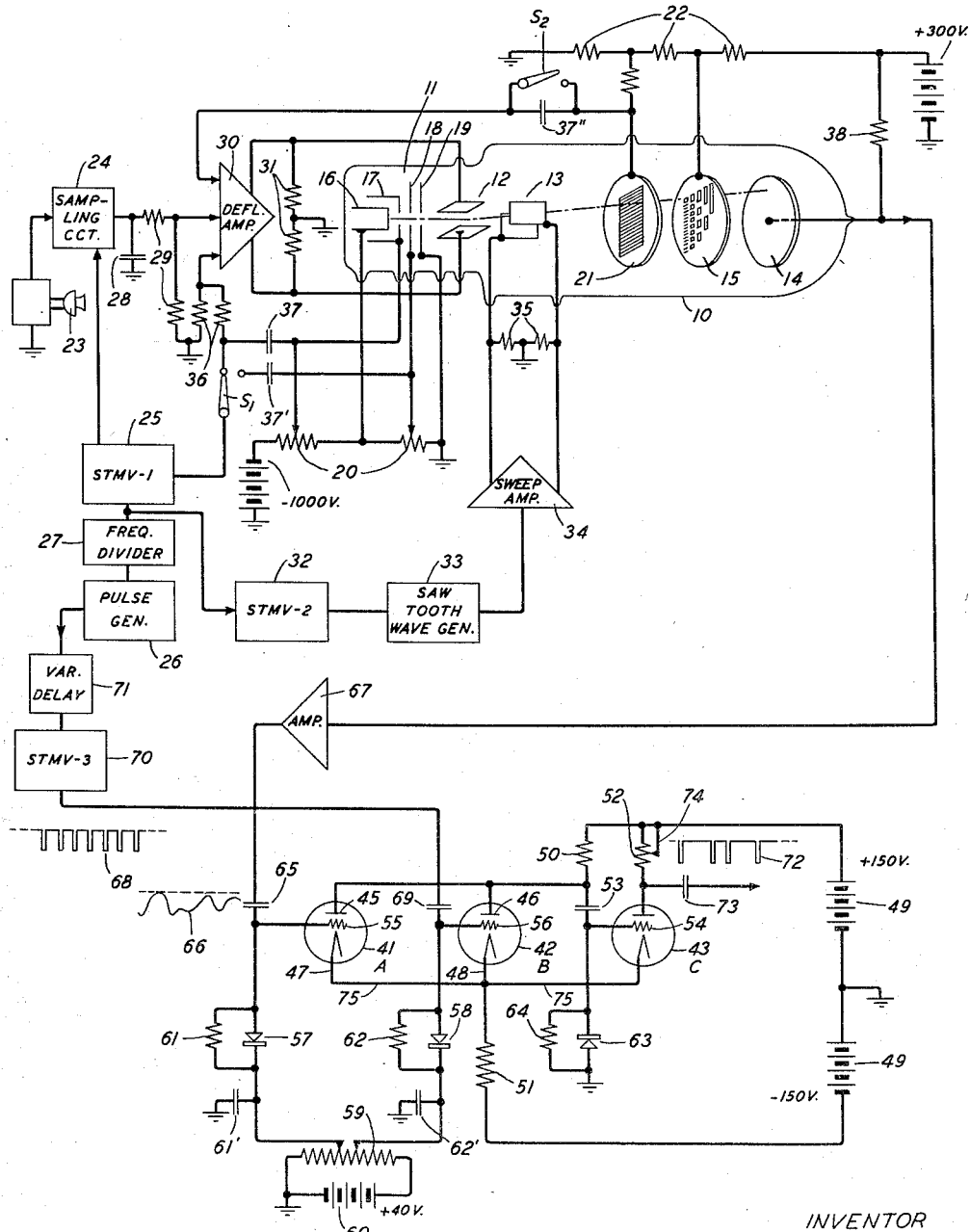

Jan. 9, 1951        L. A. MEACHAM        2,537,843

PULSE REGENERATION APPARATUS

Filed Sept. 9, 1947        2 Sheets-Sheet 1

INVENTOR
L. A. MEACHAM
BY
Harry C. Hart
ATTORNEY

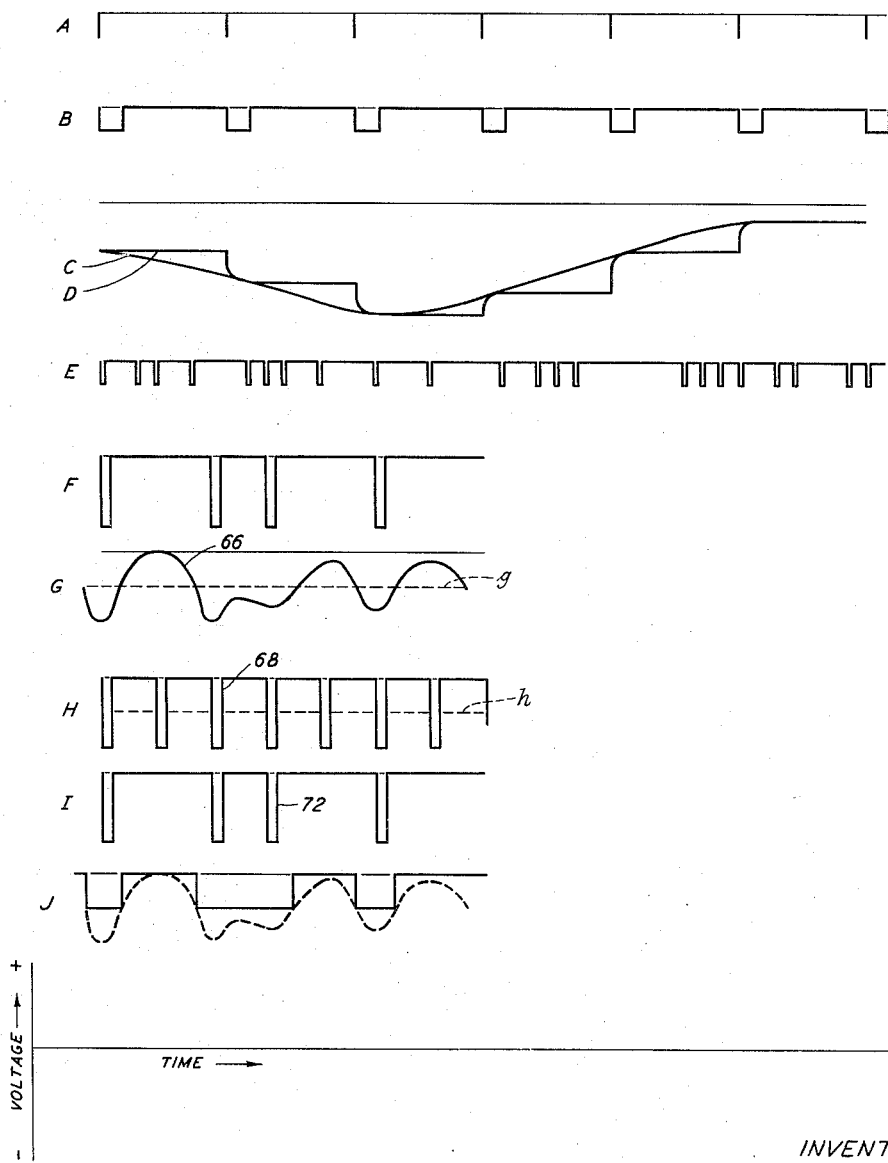

Patented Jan. 9, 1951

2,537,843

UNITED STATES PATENT OFFICE 2,537,843

PULSE REGENERATION APPARATUS

Larned A. Meacham, New Providence, N. J., assignor to Bell Telephone Laboratories, Incorporated, New York, N. Y., a corporation of New York Application September 9, 1947, Serial No. 772,913

10 Claims. (Cl. 250—27)

This invention relates to pulse code communication and particularly to the regeneration of code pulses which may have been degraded in amplitude, wave form, time of occurrence or otherwise in the course of transmission or translation.

The principal object of the invention is to effect such regeneration in a simple and efficient manner. A more general object is to restore their correct or original character to pulses originating in any source and degraded by any cause.

A related object is to slice off, squarely and at an adjustable amplitude level, pulses whose peaks are rough or rounded.

Another related object is to apply a time gating pulse to a wave of arbitrary form, producing an output only when the wave and the gating pulse are present together, either one alone, although of excessive magnitude, being insufficient.

A subsidiary object is to facilitate the measurement or determination of the amount of amplitude distortion or delay distortion which may have been added to sharp, square-peaked pulses in the course of any translation process to which they may have been subjected.

These and other objects of the invention are attained by means of a circuit arrangement comprising a plurality of electron discharge devices intercoupled in a particular way, and to one of which are applied the pulses to be regenerated, while periodically recurring gating pulses are applied to another. The slicing level of each set of pulses is controlled at will by adjustment of a grid bias, while the gating instant is controlled at will by adjustment of a variable delay device. The system trips to give a sharp, square output pulse when, and only when a pulse to be regenerated coincides in time with a gating pulse.

The amplitudes of these square output pulses are freely controllable by adjustment of an output resistor, and their durations are equal to the time intervals during which the pulses to be regenerated and the gating pulses simultaneously exceed their respective slicing levels. By means of a simple biasing adjustment, the circuit may be made responsive to degraded pulses whose amplitudes are equal to or greater than one-quarter, one-half, three-quarters, or any other desired fraction of their nominal amplitudes; i. e., of the amplitudes which they would have were they not degraded. Thus, in effect, the circuit examines each degraded pulse at a controllable instant and determines whether, at that instant, and as compared with an adjustable amplitude level, it is "on" or "off."

The invention will be fully apprehended from the following detailed description of a preferred embodiment thereof, taken in conjunction with the appended drawings in which:

Fig. 1 is a schematic diagram showing the pulse regeneration apparatus of the invention as embodied in a pulse code transmission system; and, Fig. 2 is a diagram showing the wave form of pulses as they appear at various points of the circuit arrangement of Fig. 1.

Referring now to the drawings, Fig. 1 shows a coder device for translating a voice wave or other message signal into binary code pulses. The basic features of the apparatus, which are fully described in articles published in the Bell System Technical Journal for January 1948 (vol. 27), pages 1 and 44, comprise a cathode beam tube 10 including an electron gun 11 for projecting a cathode beam, vertical deflection plates 12 to which the signal to be coded is applied, horizontal deflection plates 13 for sweeping the beam in a perpendicular direction, a collector anode 14 and a coding mask 15. The electron gun 11 may comprise a cathode 16, a control electrode or grid 17, a focusing electrode 18 and an accelerating electrode 19. These electrodes may be furnished with operating potentials by connection to a voltage divider 20 in conventional fashion. Operating potentials may be applied to the collector anode 14, coding mask 15 and to a quantizing grid 21 described below from another voltage divider 22.

In operation, a signal to be coded, for example, a voice message originating at a source 23 is repeatedly sampled by a sampling circuit 24 under control of a single trip multivibrator 25 which delivers short square pulses at the sampling frequency. The latter is in turn controlled by a basic timing circuit or pulse frequency generator 26, through the medium of a suitable subharmonic generator or frequency divider 27. Each speech sample, after being taken, is stored on a storage condenser 28 for use in the coding device, until the arrival of a new sample. The resulting voltage on the storage condenser is applied by way of a voltage divider 29 to a vertical deflection amplifier 30 whose output may be balanced to ground by way of a center tapped resistor 31 and applied to the vertical deflection plates 12. The pulse generator 26 also controls a second single trip multivibrator 32 delivering square pulses of somewhat greater duration than those of the first single trip multivibrator 25. These, in turn, control a sawtooth wave generator 33 delivering a sawtooth voltage to a sweep amplifier 34 whose output, balanced to ground by way of a center tapped resistor 35 is applied to the horizontal deflection plates 13. Thus, after vertical deflection of the cathode beam to a desired position on the coding mask 15 by the application of a signal sample to the vertical deflection amplifier 30, the beam is swept in a horizontal direction, along a particular row of apertures of the coding mask 15 by the sawtooth wave generator 33 to deliver a sequence of pulses at the collector 14. By proper arrangement of the apertures in the coding mask 15 in accordance with the teachings of the Bell System Technical Journal articles above referred to, these pulses constitute a binary code group of a number of digits equal to the number of columns of apertures in the mask. As a practical matter, it has been found that a seven digit binary code, produced by a mask having seven columns of apertures, gives ample fidelity in reproduction.

As a further feature of such a system, an auxiliary electrode 21, comprising a number of wires mounted across an aperture of a mounting plate, may be provided for stabilizing the cathode beam in the course of its sweep along a particular row of apertures and for quantizing the signal-controlled deflection in the direction normal to these rows. This stabilizing and quantizing action is attained by virtue of a feedback from the stabilizing grid 21 to the vertical deflection amplifier 30, and is improved in its action by the addition of pulse signals from the single trip multivibrator 25 by way of a voltage divider 36 and the simultaneous application of these pulses to the control grid 17 by way of a blocking condenser 37. Alternatively, the pulses may be applied, merely by throwing the switch S₁ to the right on the figure, to the focussing electrode 18. Because of the rapid alteration of the signal samples, and therefore of the feedback from the quantizing grid, it has been found possible to operate successfully with alternating current feedback coupling only. Thus a blocking condenser 37 is inserted in the feedback path from the quantizing grid to the vertical deflection amplifier. The various features and the precise mode of operation of the stabilizing grid in this system are fully described in United States Patent 2,473,691, patented June 21, 1949 to Larned A. Meacham. A preferred construction of the stabilizing grid is described in United States Patent 2,458,632 to R. W. Sears.

The operation of the apparatus as thus far described may be further illustrated by reference to Fig. 2 in which the pulses A are delivered by the frequency divider 27 and control the single trip multivibrator 25, whose output may be a sequence of equally spaced square waves, as in the curve B. This controls the sampling circuit 24 which samples a signal wave C to produce successive signal samples D. These are applied to the vertical deflection plates 12 so that the cathode beam strikes one or other of the various rows of apertures in the coding mask 15. The beam is then swept along this row to give a sequence of output pulses E in a binary code arrangement which is different for each different sample amplitude. The nominal or desired appearance of a representative pulse code group is illustrated to an enlarged scale in the curve F.

Due to various defects in manufacture, such as inequalities in the apertures of the coding mask, misalignment of electrodes, imperfection of focus of the electron beam, non-linearity of the sweep voltage or the like, the actual output pulses of the coder tube 10, as they appear in the form of voltage pulses on the loading resistor 38, may be seriously degraded. This degradation is represented illustratively in the curve G. Thus, for example, the first nominally sharp square pulse of the curve F may be elongated and rounded as shown in the first pulse of the curve G. In the particular pulse code group the second pulse is missing. The third pulse is increased in amplitude as compared with the nominal value while the fourth trails off for a substantial time after it should terminate. The fifth and seventh pulses, which nominally are missing in the particular code group, actually have their positions filled in to some extent and the sixth has been rounded at its peak and somewhat increased in duration.

In accordance with the invention, the output pulses of the coder device are regenerated by the circuit schematically illustrated in the lower part of Fig. 1, to give sharp square pulses of uniform amplitude and duration and occurring at the correct instants as illustrated in the curve I. In a form suitable for regenerating negative pulses, the circuit which carries out this pulse regeneration comprises three electron discharge devices, for example, triodes 41(A), 42(B), 43(C) of which the first and second are preferably identical and have their anodes 45, 46 and cathodes 47, 48 connected directly together. They are supplied with operating potential from a source 49 of perhaps 300 volts of which the center point may be grounded, and by way of a common anode resistor 50 and a common cathode resistor 51. The third tube 43, which may have similar characteristics to the first two tubes may be supplied with operating potential from the same source 49 but by way of a separate anode resistor 52, while its output is returned by way of the same cathode resistor 51 as the first two tubes. The anodes of the first two tubes are coupled by way of a blocking condenser 53 to the control grid 54 of the third tube 43. The control grids 55, 56 of the first two tubes are returned to ground by way of rectifier elements 57, 58 such as varistors, diodes, or the like, connected for conduction from grid to ground and by way of a variable tap on a grid resistor 59 connected across a "C" battery 60 of 40 volts or so whose negative terminal is grounded. Each varistor is preferably shunted by an ohmic resistor of high value. The control grid 54 of the third tube 43 is returned to ground by way of a similar rectifier element 63 oppositely connected, i. e., connected for conduction from ground to grid, and likewise shunted by an ohmic resistor 64 of high value.

Incoming code pulses to be regenerated are applied to the grid 55 of the first tube 41. Because the current passing through the apertures of the coding mask 15 to the collector anode 14 is an electron current, the resulting voltage pulses 66 across the loading resistor 38 of the coding device 10 are negative. It is to be understood that the amplifier 67 delivers amplified pulses of the same negative polarity. Recurrent gating pulses 68 are applied by way of a condenser 69 to the control grid 56 of the second tube 42. These are likewise negative pulses, produced by a third single trip multivibrator 70 under control of the prime pulse generator 26. The instants at which they occur, with reference to the instants of occurrence of the pulses 66 to be regenerated may be adjusted by a variable delay device 71. The regenerated output pulses 72 of the circuit are delivered by way of a condenser 73 to any suitable load and their magnitudes may be adjusted by varying the position of a tap 74 on an output load resistor.

This circuit arrangement, in configuration and in mode of operation, is similar to trigger circuits of a certain type which have come to be known as "flip-flop" circuits, but differs therefrom in that joint control by the coincidence of pulses from two independent sources is required for tripping. In operation, and in the absence of incoming pulses, tubes A and B are conductive, while tube C is not conductive. This state persists indefinitely unless the grids of tubes A and B are both made negative with respect to a critical range of potentials marked $g$ and $h$ in the waves G and H, respectively. When a negative pulse to be regenerated reaches the grid of tube A and of amplitude in excess of this critical range, the tube A is driven below cut-off, conduction ceases and the potential of the common cathode connection 75 of tubes A, B and C falls slightly. Because of the resultant change in grid-to-cathode potential of tube B, conduction is substantially doubled through the tube B without, however, greatly altering the total current through the common cathode resistor 51 or the corresponding voltage drop across the common anode resistor 50. Thus this change in condition has but a negligible effect on the grid of the tube C, and is insufficient to alter the situation.

When, now, the tube A being cut off by the presence of a negative pulse to be regenerated, a negative gating pulse reaches the control grid of the tube B with an amplitude sufficient to carry this grid below the critical potential, the situation is radically changed. First, as tube B approaches cut-off, the reduction of the current flow through the common anode resistor 50 increases the potential of the anodes of the tubes A and B. Second, rise of the potential of the anodes of the tubes A and B delivers a rising voltage increment by way of the condenser 53 to the control grid 54 of the tube C, causing it to commence to conduct. The current of the discharge path of the tube C then flows through the common cathode resistor 51. The circuit parameters are so chosen that the rate of increase of this current exceeds the rate of decrease of the cathode current of tube B, so that there is a net increase in the potential of the common cathode circuit. Such increase in cathode potential tends further to reduce the conduction of tube B. In fact the transient is normally made self-sustaining, so that as the critical condition of instability is reached, tube C takes over conduction fully from tube B and remains conducting as long as pulses exceeding the critical thresholds are present on the control grids of tubes A and B together. Flow of current in the tube C gives rise to a voltage drop across the load resistor 52.

As soon as either of these controlling pulses is removed, thus allowing the tube A or B, as the case may be, to return its grid above cut-off, this tube immediately commences to conduct, thus causing a negative voltage increment on the grid of tube C, a net negative voltage change of the common cathode potential and hence passage through the unstable condition as previously described, but in the opposite direction. In this process, the conduction of tube C, and the consequent voltage drop across the load resistor 52 are interrupted. Conditions thus return immediately to the original condition in which one or both of the tubes A and B are conducting and tube C is cut off.

To summarize, in the absence of pulses, tubes A and B conduct; tube C is non-conducting. In the simultaneous presence of pulses of both types on the grids of the tubes A and B, these tubes cease conducting, and the tube C conducts. In the presence of a pulse passing through the critical threshold of the grid of either tube A or tube B, that tube and only that one ceases to conduct, but the tube C remains non-conductive. Thus, if pulses arrive at the two grids of the tubes A and B which do not coincide in time, conduction alternates between tubes A and B, while tube C continues to be non-conductive. Only when pulses exceeding the critical threshold are simultaneously applied to the grids of tubes A and B, do both of these tubes cease to conduct and so cause conduction of the tube C.

The circuit differs from an ordinary multivibrator circuit as commonly employed in two major respects. First, by the use of large values for the coupling condenser 53, and for the grid resistor 64, the time constant which they afford when the rectifier 63 is not conducting is made long in comparison with the longest pulse to be encountered. Thus there is no self-recovery, or relaxation of the circuit; it remains in stable condition until tripped by the coincident arrival of pulses on the grids of tubes A and B, and it remains tripped until one or the other of these pulses terminates. Second, by correct choice of the magnitude of the anode resistor 50 of the tubes A and B, the feedback ratio of the circuit is preferably adjusted to a value barely exceeding unity, with the result that the margin of instability of the circuit is very small. In consequence, the pulse amplitude threshold which causes alteration in the conditions of the circuit, i. e., which changes it from a first stable condition, through a condition of instability to a second stable condition, is the same in the forward direction (leading edge of a pulse) as it is in the reverse direction (trailing edge of a pulse). Thus, assuming the tube B to be entirely removed and that the circuit consists merely of the intercoupled tubes A and C, the circuit is tripped from one stable condition to the other as the pulse (curve G) crosses the critical threshold in the downward direction, and is tripped again and returned from the second condition to the first when the trailing edge of the pulse rises through the same critical threshold value. Indeed, the circuit can be employed in this manner, as a slicer, without application of gating pulses thereto, to give a square wave output as indicated in the curve J.

As above indicated, the parameters of the circuit are so adjusted that it barely becomes unstable in a transient fashion when one of the tubes A, B is non-conducting and when the potential of the grid of the other, for example, tube A, is reduced by an incoming pulse to the grid potential of the tube C, i. e., when the potentials of these two grids are alike. Since the potential of the grid of tube A is the resultant of its steady bias derived from the potentiometer 59, and the pulse voltage, it follows that the potential difference between the biases of the tubes A and C determines the critical slicing threshold for the pulses. This difference may be adjusted by changing the position of the corresponding one of the movable taps on the potentiometer 59. In similar fashion the critical threshold for the gating pulses applied to tube B may be adjusted by means of the other movable tap.

For the purpose of regenerating degraded pulses and removing amplitude or phase distortion due to the coding process or other disturbance, it is preferred to adjust the tripping threshold of the circuit to approximately one-half of the nominal peak value of the pulses. This adjustment is indicated as $g$ and $h$ in the curves G and H, and gives the greatest probability of preventing undesired tripping caused by noise pulses occurring in the absence of signal pulses or undesired failure to trip caused noise pulses tending to reduce the amplitude of the pulses to be regenerated, and therefore gives the most secure regeneration. However, for certain purposes it is entirely possible, and contemplated in accordance with another aspect of the invention, to adjust the tripping threshold otherwise, for example, to the potential level of the normal peak amplitudes of the pulses themselves, or very slightly above them. The system will then be tripped only when a pulse exceeds its nominal value, for example, due to the addition of noise in phase with it, and the output of the circuit is therefore a measure of the amount of amplitude degradation which the pulses may have suffered.

Furthermore, the instant at which the circuit is tripped may be altered by adjustment of the variable delay device 71 so as to bring the gating pulses out of coincidence with the centers of the degraded pulses and into coincidence, for example, with the trailing edges of these pulses at approximately one-half their amplitude. Under these conditions, there will be no output from the system when undegraded pulses are applied to the grid of the tube A and the output of the system will be a measure of the error in occurrence of the return side of the degraded pulses.

Thus, by combined variation of the bias voltage taps and of the variable delay device 71, it is possible to examine a sequence of incoming pulses through what is in effect a small aperture whose location with respect to the pulses may be varied at will either upward or downward (tripping threshold variation) or from side to side (gating pulse time variation).

The use of the rectifier elements 57, 58, 63 shunted by the resistors 61, 62, 64 of high value, and acting in conjunction with the coupling condensers 65, 69, 53 insures that the instantaneous potential of the grid of each tube in the absence of a pulse thereon shall be substantially equal to the corresponding steady applied bias, and thus that the tripping potential applying to either tube A or tube B shall remain substantially the same, regardless of what fraction of the total time may be occupied by pulses. The coupling condensers, however, are in no sense essential. The function of the coupling condensers is merely to permit adjustment of the grid bias voltages independently of the potentials of the pulse sources. Any one or more of the grids of the tubes A, B and C may, if preferred, be directly coupled to the source which supplies pulses to it.

In the case of the condenser 53, if it is omitted, a potentiometer may be connected between the anode 46 of the tube B and the negative terminal of the battery 49, the grid 54 being connected by way of a movable tap to a suitable point. With this connection the relaxation time of the circuit is infinite and the second stable condition, in which the tube C is conducting, is fully as stable as the first.

The system is not restricted to the use of the rectifier polarities shown. If all three rectifiers 57, 58, 63 are reversed in polarity so as to conduct in the opposite direction, and if the bias battery 60 is also reversed in polarity, the system will deal suitably with positive pulses. In this case a square positive output pulse of uniform height will be produced if the grid of either one of the tubes A and B is carried above the critical potential applying thereto.

Moreover, the system is not restricted to the use of such rectifier elements, and, if desired, they can be replaced with bidirectionally conducting resistors. In this case, and if the bias potentials of the tubes A and C are adjusted to be alike, the system can operate as a pulse slicer, slicing at a threshold which corresponds to the average value of the wave to be sliced instead of being at a prescribed voltage difference from the peak excursion in one direction.

While described and illustrated in connection with its use as a regenerator of degraded signal pulses employing gating pulses which are narrower, i. e., of shorter duration, than the signal pulses, the invention is not restricted to this use. It is equally well adapted to use as a distributor of code pulse groups, in which case each gating pulse may be of a length comparable with the length of a whole signal code pulse group.

The invention thus provides a system by which a plurality of independent input pulses jointly control an output pulse, the output pulse commencing upon the arrival of the last of the input pulses to arrive and terminating on the termination of the first of the input pulses to terminate. Each sequence of input pulses is applied to one of a number of input tubes and these input tubes jointly control the output tube. In the example shown the number of independent input pulse sequences and the like number of input tubes is two. But the invention may obviously be extended to cases in which the input pulses or pulse sequences are three or more in number.

What is claimed is:

1. In combination with a plurality of independent pulse sources, a circuit arrangement adapted to deliver square output pulses on the concurrent application of a pulse from each of said sources which comprises, in combination with a potential source having at least three points of fixed potential, two electron discharge devices each having a cathode, an anode and a control electrode, said cathodes being connected together and said anodes being connected together and by way of a common anode impedance element to a first one of said fixed potential points, a coupling from one of said pulse sources to the control electrode of the first device, a coupling from another of said sources to the control electrode of the second device, a third electron discharge device having a cathode, an anode and a control electrode, a common cathode impedance element connecting the cathodes of all of said devices to a second one of said fixed potential points, individual impedance elements connecting the several control electrodes to a third one of said fixed potential points, and a coupling from the anodes of said first two devices to the control electrode of said third device.

2. In combination with a plurality of independent pulse sources, a circuit arrangement adapted to deliver square output pulses on the concurrent application of a pulse from each of said sources which comprises, in combination with a potential source having at least three points of fixed potential, two electron discharge devices each having a cathode, an anode and a control electrode, said cathodes being connected together and said anodes being connected together and to a first one of said fixed potential points, a coupling from one of said pulse sources to the control electrode of the first device, a coupling from another of said sources to the control electrode of the second device, a third electron discharge device having a cathode, an anode and a control electrode, a common cathode impedance element connecting the cathodes of all of said devices to a second one of said fixed potential points, individual impedance elements connecting the several control electrodes to a third one of said fixed potential points, and a coupling from the anodes of said first two devices to the control electrode of said third device.

3. A first, a second and a third electron discharge device, each having at least a cathode, an anode and a control electrode, a common source of anode potential for said devices and a common impedance element connecting the cathodes of all of said devices to a first fixed potential point of said source, individual impedance elements connecting the several control electrodes to a second fixed potential point of said source, a low-impedance coupling from the anodes of said first and second discharge devices to the control electrode of said third discharge device, a source of pulses to be regenerated, a source of gating pulses, means for applying said pulses to be regenerated to the control electrode of said first device, and means for applying said gating pulses to the control electrode of said second device.

4. A first, a second and a third electron discharge device, each having at least a cathode, an anode and a control electrode, a common source of anode potential for said devices and a common impedance element connecting the cathodes of all of said devices to a first fixed potential point of said source, individual impedance elements connecting the several control electrodes to a second fixed potential point of said source, a low-impedance coupling from the anode of one of said first two named discharge devices to the control electrode of said third discharge device, a source of pulses to be regenerated, a source of gating pulses, means for applying said pulses to be regenerated to the control electrode of said first device, and means for applying said gating pulses to the control electrode of said second device.

5. A first, a second and a third electron discharge device, each having at least a cathode, an anode and a control electrode, a common source of anode potential for said devices and a common impedance element connecting the cathodes of all of said devices to a first fixed potential point of said source, individual impedance elements connecting the several control electrodes to a second fixed potential point of said source, a low impedance coupling from the anode of at least one of said first two named discharge devices to the control electrode of said third discharge device, a source of pulses to be regenerated, a source of gating pulses of substantially less duration than said pulses to be regenerated, means for applying said pulses to be regenerated to the control electrode of said first device, and means for applying said gating pulses to the control electrode of said second device.

6. In a pulse code communication system in which pulses having distinctive nominal wave forms and a definite nominal recurrence rate are degraded in the course of translation, means for regenerating said pulses to remove said degradation which comprises a normally disabled flip-flop circuit having output terminals and having, when enabled, a first stable state, a second stable state, an intermediate barely unstable state and a tripping threshold, means for applying degraded pulses to said circuit to trip it from the first stable state to the second stable state on arrival of the leading edge of a pulse in excess of said threshold and to return it from said second stable state to said first stable state upon reduction of the trailing edge of said pulse below said threshold, means for adjusting said threshold to substantially one half of the nominal amplitude of said pulses, means for enabling said flip-flop circuit under control of the leading edge of each member of a sequence of gating pulses, and for disabling said circuit at the termination of each member of said sequence, and means for deriving substantially rectangular pulses for transmission from output terminals of said flip-flop circuit.

7. In a pulse code communication system in which pulses having distinctive nominal wave forms and a definite nominal recurrence rate are degraded in the course of translation, means for regenerating said pulses to remove said degradation which comprises a normally disabled flip-flop circuit having output terminals and having, when enabled, a first stable state, a second stable state, an intermediate barely unstable state and an adjustable tripping threshold, means for applying degraded pulses to said circuit to trip it from the first stable state to the second stable state on arrival of the leading edge of a pulse in excess of said threshold and to return it from said second stable state to said first stable state upon reduction of the trailing edge of said pulse below said threshold, means for adjusting said threshold in relation to the nominal amplitude of said pulses, means for enabling said flip-flop circuit under control of the leading edge of each member of a sequence of gating pulses recurring regularly and for disabling said circuit at the termination of each member of said sequence, means for adjusting the occurrence instants of said gating pulses in relation to the nominal occurrence instants of said degraded pulses, and means for deriving substantially rectangular pulses for transmission from output terminals of said flip-flop circuit.

8. In a pulse code communication system in which pulses having distinctive nominal wave forms and a definite nominal recurrence rate are degraded in the course of translation, means for regenerating said pulses to remove said degradation which comprises a normally disabled flip-flop circuit having output terminals and having, when enabled, a first stable state, a second stable state, an intermediate barely unstable state and a tripping threshold, means for applying degraded pulses to said circuit to trip it from the first stable state to the second stable state on arrival of the leading edge of a pulse in excess of said threshold and to return it from said second stable state to said first stable state upon reduction of the trailing edge of said pulse below said threshold, means for adjusting said threshold to substantially one half of the nominal amplitude of said pulses, means for enabling said flip-flop circuit under control of the leading edge of each member of a sequence of gating pulses recurring at instants coinciding with the nominal occurrence instants of said degraded pulses and for disabling said circuit under control of the termination of each member of said sequence, and means for deriving substantially rectangular pulses for transmission from output terminals of said flip-flop circuit.

9. In a pulse code communication system in which pulses having uniform nominal amplitudes are degraded in the course of translation, means for regenerating said pulses to standardize their amplitudes which comprises a pair of electron discharge devices each having a cathode, an anode and a control electrode, said cathodes being connected together and to a common cathode resistor, said anodes being connected to individual resistors, a common source connected to supply discharge current to said devices by way of said individual anode resistors and to said common cathode resistor, said common cathode resistor constituting a coupling means between said devices, additional coupling means from the anode of the first device to the control electrode of the second device, a unilaterally conducting element, poled in one direction, in the control electrode circuit of the first device, a second unilaterally conducting element, poled in the opposite direction, in the control electrode circuit of the second device, connections for applying pulses to be regenerated to the control electrode of the first device, a variable bias source for adjusting the conduction threshold of said first device, and connections for withdrawing regenerated pulses from said second device.

10. Slicing-and-gating apparatus for regenerating degraded pulses which comprises a normally disabled flip-flop circuit having output terminals and having, when enabled, a first stable state, a second stable state, an intermediate barely unstable state and a tripping threshold, means for applying degraded pulses to said circuit to trip it from the first stable state to the second stable state on arrival of the leading edge of a pulse in excess of said threshold and to return it from said second stable state to said first stable state upon reduction of the trailing edge of said pulse below said threshold, means for adjusting said threshold to a desired fraction of the nominal amplitude of said pulses, means for enabling said flip-flop circuit under control of the leading edge of each member of a sequence of gating pulses and for disabling it at the termination at said gating pulse, and means for deriving substantially rectangular pulses for transmission from output terminals of said flip-flop circuit.

LARNED A. MEACHAM.

REFERENCES CITED

The following references are of record in the file of this patent:

UNITED STATES PATENTS

| Number | Name | Date |
|---|---|---|
| 1,778,377 | Burton | Oct. 14, 1930 |
| 2,005,111 | Shore | June 18, 1935 |
| 2,187,158 | Kinkead | Jan. 16, 1940 |
| 2,405,843 | Moe | Aug. 13, 1946 |
| 2,454,815 | Levy | Nov. 30, 1948 |

OTHER REFERENCES

Puckle: Book entitled "Time Bases," Oct. 1943, published by John Wiley and Sons Inc., pages 57–59.

M. I. T. Staff: "Applied Electronics," published by John Wiley and Sons, pages 525–526, copyright 1943.

An Improved Cosmic-Ray Sonde, W. H. Pickering, The Review of Scientific Instruments, vol. 14, number 6, June 1943, pages 171–173.